Aug. 6, 1929.　　　A. G. SCHWIETERMAN　　　1,723,529

CENTER FINDER

Filed April 18, 1927

Inventor
August G. Schwieterman
By
His Attorneys

Patented Aug. 6, 1929.

1,723,529

UNITED STATES PATENT OFFICE.

AUGUST G. SCHWIETERMAN, OF DAYTON, OHIO.

CENTER FINDER.

Application filed April 18, 1927. Serial No. 184,791.

This invention relates to center finders for boring machines and the like.

The object of this invention is to facilitate the use of center finders for boring machines and the like in accurately locating the centers of previously drilled holes, when reboring, and for locating the position of the boring tool for drilling new holes.

Another object of this invention is to provide a center finding device or instrument for boring machines having an indicator which can be held stationary while the feeler therefor is being rotated.

With these and incidental objects in view, the invention includes certain novel features of construction and combinations of parts, the essential elements of which are set forth in appended claims, and a preferred form or embodiment of which is hereinafter described with reference to the drawings which accompany and form part of this specification.

*General description.*

Figure 1:
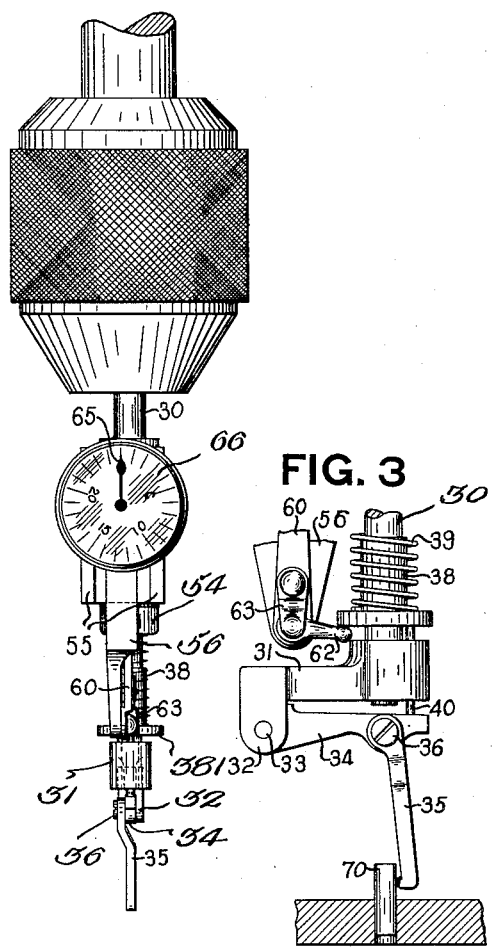
Fig. 1 is a view in front elevation of the center finding device shown attached to the spindle of a boring machine.

The center finding device shown herein is provided for accurately aligning the tool of a boring machine with the center of a previously drilled hole, for either reboring the hole or for locating new holes from the center of the old hole. The usual method of finding the center of a previously drilled hole is to line up the hole with the tool and thereafter lower the tool, into the opening until the drill fits the opening. However, this method is very inaccurate because the boring tool can be forced out of line, and therefore, the holes located in this manner are apt to be inaccurate. By use of the device shown herein, the center of the previously drilled holes can be located within .0001 of an inch. The location of new holes which are to be drilled can be determined from the previously drilled holes, by means of micrometer instruments with which boring machines are usually provided.

In some devices of the type shown herein, the indicator rotates with the chuck of the boring machine. In that type of device, it is necessary to manually turn the device to various positions and then adjust the work while the boring machine is stopped. In order to accurately locate a hole by this method, a great deal of time is consumed. In the present device, the indicator is so mounted that it can be held stationary by the hand of the operator while the chuck of the boring machine rotates the feeling finger. The operator can adjust the work while the boring machine is revolving the feeler, and in this manner can locate the center of a hole within a very few minutes, whereas by the old method, it sometimes required as much as one hour.

Another saving of time is effected by the present device because it sometimes is unnecessary to bore the hole after it is reamed. The ordinary method employed is to first drill the hole, then ream it out, and last, bore the hole for very accurate work. By use of the indicator after the reaming operation, the operator can determine the accuracy of the hole, and if it is within the specified limit, the boring operation can be dispensed with.

Thus it can be seen that by using the improved feeling device, the amount of labor required is cut down to a minimum.

When the center finding device is to be used for locating the center of a hole, the boring tool may be first inserted in the chuck and the center located approximately. After the chuck is thus located, the boring tool is removed and the center finding device placed in the chuck, after which the feeling finger is adjusted to the size of the hole. By holding the indicator as the chuck rotates, any variation in the location of the shank of the center finder off center will be indicated on the indicator to .0001 of an inch.

Another use for the center finding device shown herein is in locating holes from a previously drilled gauge. When used in connection with a gauge, the work is clamped on the boring machine and the gauge, which has previously drilled holes therein, is properly located on the work by the use of the center finder. After locating the center of the holes to be drilled, the gauge is removed from the work and the holes drilled therein.

Detailed description

The invention particularly resides in the provision of a mounting for the indicator mechanism, which latter mechanism, in itself, forms no part of this invention, it being convenient for the purpose of this invention, to utilize the indicator mechanism disclosed in U. S. Letters Patent to H. A. Lowe, No. 1,144,367, issued June 29, 1915.

This indicator mechanism is more particularly adapted for disclosing inequalities in plane surfaces, and the present invention seeks to so mount such indicator mechanism, that it may be utilized as a center finder, for quickly, easily and accurately locating the position of the drill tool with relation to holes already drilled, or to be drilled.

It is also highly advantageous to have a self-contained instrument comprising the indicator mechanism and its mounting united in a single device for easy handling, without danger of separation of its component parts.

To these and other ends, that form of the invention herein disclosed, includes a straight shank or support 30, one end of which is adapted for insertion into the chuck or tool holder of a boring machine or similar precision mill.

A bracket 50 is rotatably mounted on the shank 30, preferably intermediate the ends of the shank, the bracket including an apertured body portion through which the shank 30 extends, and a pair of laterally projecting flanges 55 adapted to embrace the indicator frame 56 between them, so that the indicator frame lies alongside and substantially in parallelism with the shank 30. A fastening 57 passing transversely through the flanges 55, pivotally connects the indicator frame to the bracket.

The bracket connects the shank and indicator in such manner that the indicator and bracket can be held stationary in the most convenient position to be observed, while the shank is rotated.

To maintain the bracket and indicator mechanism against shifting axially of the shank 30, abutments 51 and 52 are provided on the shank, at opposite ends of the body portion of the bracket 50.

One of these abutments or shoulders, as 51, may be fixed to the shank 30, while the opposite abutment 52 may be removably mounted on the shank or support, to position the bracket relatively to the fixed abutment.

Preferably the opposing faces of the abutments are beveled to contact with the correspondingly countersunk ends of the aperture in the bracket.

The adjustable abutment 52 is conveniently formed of an annular head in one end of a collar, the latter surrounding the shank 30 and insertible within the aperture in the bracket 50. The adjustable abutment is slid along the shank until the ends of the bracket lie in contact with the abutments 51 and 52 respectively, whereupon a lock nut 54 is screwed on a threaded portion 53 of the shank located adjacent the outer end of the abutment 52, to hold the abutment in adjusted position.

The adjustable abutment 52 may fit snugly about the shank so that it can be shifted thereon only by the exercise of an appreciable force.

Also, the shiftable abutment 52 can be adjusted as required by turning the lock nut 54 in one direction or the other.

Operating mechanism

The hub of an arm or supporting member 31 is fastened rigidly to the free end of the shank 30, the arm or supporting member projecting laterally from the shank, preferably at right angles thereto, and having a pair of ears 32 depending from its outer end. A stud 33 passing through the ears 32 pivotally connects one end of an arm 34 to the rigid supporting member 31. The pivoted arm 34 lies beneath the rigid supporting member 31, and a feeler or finger 35 is pivoted at a point preferable in line with the longitudinal axis of the shank 30, by a friction connection 36 to the outer end of the arm 34.

An indicator controlling sleeve 38 having an annular flange 381 thereon is slidably mounted on the shank 30 between the rigid support 31 and the adjustable lock nut 54, a spring 39 encircling the control sleeve and bearing at one end against the adjustable lock nut 54 and at its opposite end against the flange 381 to shift the sleeve 38 towards the rigid support 31.

In order to communicate motion between sleeve 38 and arm 34, a rod or pin 40 is provided. This rod or pin is loosely or slidably mounted in the hub of the rigid arm 31 in substantial parallelism with the straight shank 30, one end of the rod lying in the path of the lower face of the flange 381 of the sleeve, and the opposite end of the rod projecting into contact with the inner face of the free end of the pivoted arm 34.

Through this connection, the feeler 35 is enabled to control the position of the sliding sleeve 38 to shift it more or less against the tension of the spring 39 as the feeler follows the convex or concave surfaces against which it is held by the tension of the spring 39 exerted through the sleeve, the rod 40 and the pivoted arm 34.

The lower face of the flange 381 of the sleeve 38 also contacts the outer end of an indicator operating arm 62 adjustably connected by a friction spring clip 63 to the driving arm 60 of the indicator mechanism pivoted on a stud 61 mounted in the indicator frame 56 coaxially with the pivotal point of the indicator operating arm 62.

The spring clip 63 permits adjustment of the operating arm 62 of the indicator relatively to the driving arm 60, and holds the parts in adjusted position.

A tooth 59 at that end of the driving arm 60 opposite the pivot 61 traverses a spiral groove formed in a spindle 58 suitably journaled in the indicator frame 56, all as fully set forth in the patent to Lowe, heretofore mentioned. The outer end of the spindle 58 projects through a graduated dial 66 and carries a hand 65. A leaf spring 64 bears against one side of the indicator driving arm 60 to rock the driving arm in a direction to cause it to traverse the spiral groove in the indicator spindle and return the indicator hand 65 towards its "zero" position on the graduated dial 66.

Figure 2:
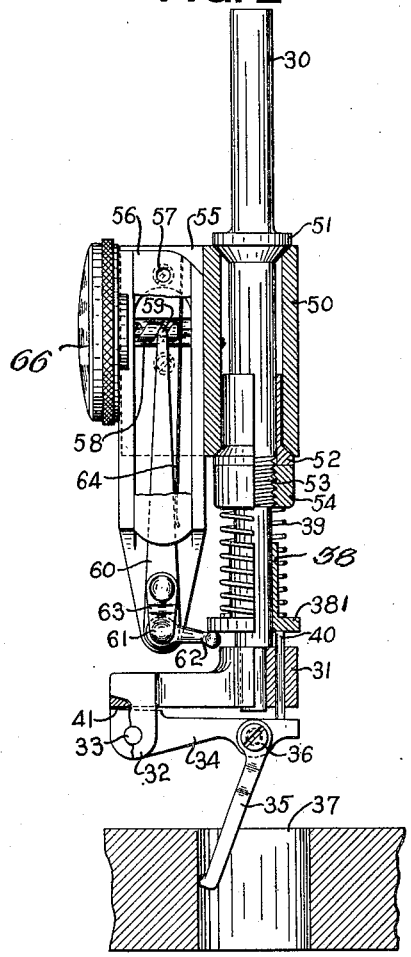
Fig. 2 is a vertical sectional view of the indicating device and shows the feeling finger therefor projecting into the previously drilled hole.

The spring 64, by tending to rock the driving arm 60 counter-clockwise (as viewed in Fig. 2) holds the operating arm 62 of the indicator against the opposite side of the flange 381 of the sleeve 38 from that against which the spiral spring 39 bears, to hold the operating arm in constant contact with the flange.

In use, after the work is clamped to the table, not shown, a boring tool is inserted in the chuck of a boring mill, for example, and adjusted to approximate alinement with the position of the hole to be bored. The tool is then removed, and the support 30 of the center-finding device inserted in the chuck. Due to the preliminary alinement, the feeler finger 35 lies adjacent the previously drilled hole 37 in the work, and may be inserted therein. The spring 39, being superior to the spring 64, holds the sleeve 38 at its outermost position on the support 30 and projects the rod 40 against the pivoted arm 34 to rock the latter and press the feeler 35 lightly against the perimeter of the hole 37. The feeler is, of course, adjusted relatively to the arm 34 so that its end will follow the contour of the hole, the pivoted arm 34 rocking on its pivot 33.

After the center-finding device has been inserted into the chuck of the boring machine, the chuck and support 30 are rotated to cause the feeler 35 to turn within the hole 37.

Any rocking movement of the feeler finger 35 due to variation in the centres of the hole and chuck, is transmitted to the operating arm 62 of the indicator, the rod 40 operating to communicate motion from the feeler finger 35 to the controlling sleeve 38 as the feeler and its arm 34 rock counter-clockwise (in Fig. 2) to shift the sleeve away from the rigid arm 31 and compress spring 39, the rod also transmitting pressure from the spring 39 through the controlling sleeve 38, to the feeler to rock the latter and its arm 34 clockwise, all according to the variations in the bore of the hole.

Any movement imparted by the feeler 35 or by the spring 39, to the controlling sleeve 38, rocks the indicator operating arm 62 and the driving arm 60. The driving arm 60 turns the spindle 58 in a corresponding direction to rotate the indicator hand, as explained in the patent to Lowe above mentioned.

The connection between the controlling sleeve 38 and the operating arm 62 is a so-called "safety connection". It will be noticed that the feeling finger 35 does not directly drive the arm 62, but controls it by means of the sleeve 38. If the feeling finger is set at such an angle that the sleeve is moved a greater distance than the indicator is permitted to turn, the control sleeve 38 will be moved up out of engagement with the arm 62. In other words, the indicator is moved by the spring 64, as the spring 39 permits through the control sleeve 38. When the control sleeve 38 is returned to its normal position by the spring 39, the indicator is positively driven by the sleeve, but no excessive strain is placed thereon because the sleeve is driven by the spring 39 which is slightly stronger than the spring 64. Thus it can be readily seen that no injury can be caused to the mechanism because straining of a part is prevented by the construction shown herein.

Figure 3:
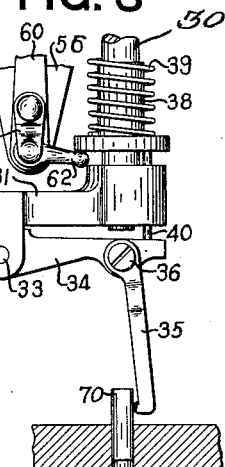
Fig. 3 is a detail view of the feeling finger of the center finding device, showing the method of using it in connection with a button, for finding the centers of previously drilled holes which are too small for the feeling finger to be inserted therein.

If the previously drilled hole is too small to permit the insertion of the feeling finger 35, a button 70 (Fig. 3) of the usual and well-known type, is inserted into the opening and the feeling finger is adjusted to move around the outer circumference of the button. If the shank 30 is not properly centered on the button 70, the arm 34 will be rocked on its pivot 33, and through the connections above described, will indicate on the dial 66 the distance which the shank is off center. The work can then be adjusted by use of the usual micrometer adjustment on the boring machine until the shank is properly centered.

By pivotally connecting the feeler arm 34 to the outer end of the radially projecting supporting arm 31, arranging the feeler arm to lie beneath and substantially parallel with the supporting arm, and then pivoting the feeler finger 35 to the free end of the feeler arm, a wide range of adjustment is provided which enables the device to be used for centering a great variety of work.

Also this arrangement enables the pivot point of the feeler finger 35 to be located directly in line with the axis of the shank 30, to afford a more compact device and more accurate adjustment of the work.

The thrust of the work against the frictionally pivoted feeler finger 35 rocks the pivoted feeler arm 34 and is transmitted through the rod 40 to the sleeve 38 in a direction parallel to the path of travel of the sleeve to prevent a possibility of the latter binding on the shank.

Compactness is also facilitated by coiling the spring 39 for the sleeve on the shank 30 and utilizing the lock nut 54 for one of the bearings, as an abutment against which one end of the spring bears.

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In a center finding device, the combination of a rotatable shank, a feeler arm pivoted on said shank, a sleeve mounted to slide on said shank, means for transmitting the movement of said feeler to said sleeve, a bracket supported by said shank in which the shank is adapted to rotate, means rigid with the shank to prevent relative axial movement between the bracket and the shank; and an indicator mounted on said bracket and adapted to be operated by the sliding of the sleeve on the shank.

2. In a center finding device, the combination of a rotatable shank, an arm secured to the shank, a feeler pivoted on said arm and adapted to engage the wall of a drilled hole, a spring-actuated sleeve slidably mounted on said shank, an indicator carried by the shank and cooperating with said sleeve, and a pin slidably mounted in said arm and disposed between the feeler and the sleeve to transmit motion from the feeler to the indicator to determine when the shank is centered with the drilled hole.

3. In a center finding device, the combination of a shank adapted to turn with the chuck of a boring machine, a feeler carried by said shank and adapted to engage the wall of a hole, a spring-actuated sleeve slidably mounted on said shank, an indicator supported on the shank, and abutments on the shank to prevent movement of the indicator longitudinally of the shank, said indicator adapted to be held stationary when the shank rotates.

4. The combination with an indicator having an operating arm; and a spring to rock the arm in one direction; of a shank; a feeler carried by the shank; a sleeve slidable on the shank and adapted to control the operating arm of the indicator; the feeler adapted to shift the sleeve in one direction; and a spring to shift the sleeve in the opposite direction under control of the feeler, the last-named spring being superior to the first-named spring.

5. The combination with a support; and an indicator having an operating arm; of a mounting for the indicator, including a body-portion rotatably mounted on the support; a sleeve slidable on the support; a spring to shift the sleeve in one direction to press it against the operating arm of the indicator; a radially extending arm rigidly secured to the support; an arm pivoted to the radially extending arm; a feeler finger adjustably connected to the pivoted arm; and means intermediate the pivoted arm and the sleeve to shift the sleeve against the tension of its spring.

6. The combination with a support; and an indicator having an operating arm; of an indicator bracket on which the indicator is mounted, the indicator bracket being rotatably mounted on the support; a sleeve slidable on the support; a spring to shift the sleeve in one direction on the support, to press the sleeve against the operating arm of the indicator; an arm rigidly secured to the support; a feeler arm pivotally connected to the rigid arm; a feeler finger adjustably connected to the pivoted arm; and a slidable transmitting rod interposed between the pivoted arm and the sleeve, and arranged parallel with the support to communicate motion to the sleeve in line with the path of travel of the sleeve.

7. A combined indicator and mounting therefor, including a support; an indicator having an operating arm; and means to actuate the arm in one direction; a bracket member rotatably mounted on the support, the indicator being secured to the bracket member; abutments on the support to hold the bracket member in place; means tending to rock the operating arm of the indicator in the opposite direction; a feeler finger carried by the support; and a device operable by the feeler finger in opposition to the last-named means to free the operating arm to the action of its actuating means.

8. The combination with an indicator mechanism; of a mounting therefor, including a support; a bracket rotatable on the support, the indicator mechanism being secured to the bracket and having an indicator operating arm; abutments on the support to rigidly limit movement of the bracket axially thereof; one of the abutments being adjustable on the support; a slidable sleeve to control the indicator; a feeler to slide the sleeve in one direction away from the indicator arm; and a spring to slide the sleeve in the opposite direction towards the indicator arm under control of the feeler.

9. The combination with an indicator mechanism; of a mounting therefor, including a support; a bracket rotatable on the support, the indicator mechanism being secured to the bracket and having a spring-actuated indicator operating arm; abutments on the support to limit movement of the bracket axially thereof; one of the abutments comprising a collar adjustable along the support; a lock nut to adjust the collar and hold it where adjusted; a slidable sleeve to control the indicator; a feeler to slide the sleeve in one direction away from the indicator operating arm; and means to slide the sleeve in the opposite direction towards the indicator operating arm under control of the feeler.

10. The combination with an indicator mechanism; of a mounting therefor, including a support; a bracket rotatable on the support, the indicator mechanism being secured to the bracket; abutments on the support to rigidly limit movement of the bracket axially thereof; a slidable sleeve to control the indicator; a feeler to slide the sleeve in one direction; and a spring coiled around the support and interposed between one of the abutments and the sleeve to shift the sleeve in the opposite direction under control of the feeler.

11. The combination with an indicator having a spring-pressed operating arm; a bracket to which the indicator is secured, and a support on which the bracket is rotatably mounted; of a sleeve slidable on the support to control the indicator; resilient means to shift the sleeve in one direction; a rigid projecting member fastened to the support; feeler arm pivotally connected to the member and faced in such manner as to have a limited rocking movement relatively thereto; a feeler finger adjustably connected to the feeler arm; and transmitting means to communicate motion between the feeler arm and the sleeve.

12. The combination with a rotatable support; and an indicator having an operating arm; of a control member for the indicator-operating arm mounted for axial movement on the support; a feeler carrier by the support to contact the work, and operable to shift the axially movable member away from the indicator-operating arm; a spring to shift the axially movable member against the indicator-operating arm; and an inferior spring effective to hold the indicator-operating arm in contact with the axially movable member.

13. The combination with a rotatable support; and an indicator, having an operating arm; of a control member mounted for axial movement on the support; a feeler carried by the support to rotate therewith and insertable into holes in the work; the feeler adapted to shift the axially movable member away from the indicator-operating arm in the operation of centering the work; means operable upon the indicator operating arm to cause the latter to tend to shift the axially movable control member in the same direction; and a spring operable upon the axially movable control member, and superior to the means operable on the indicator-operating arm, to shift the axially movable control member in the opposite direction.

14. In a center finding mechanism, the combination with a rotatable support for the indicator; an operating arm for the indicator, and yielding means to shift the operating arm in one direction; of an axially movable member mounted on the support and with which the operating arm freely contacts; means to shift the axially movable member against the indicator-operating arm to shift such arm in the opposite direction to that in which such arm is shifted by its yielding means; and a feeler carried by the support for rotation therewith and adapted to supplement the yielding shifting means for the operating arm, and operable on the axially movable member in the same direction as the indicator-operating arm, to shift the axially movable member against the pressure of the shifting means for the axially movable member, to free the indicator-operating arm to the action of its shifting means.

15. In a center finding device, the combination with a rotatable support; and an indicator having an operating arm spring-pressed in one direction; of a control member for the indicator-operating arm located on one side of the arm; yielding means to shift the control member towards the operating arm; a feeler carried by the support and located on the opposite side of the operating arm; and means to communicate motion between the feeler and the control member.

16. In a center finding device, the combination with a rotatable support; and an indicator having an operating arm spring pressed in one direction; of a control member for the indicator-operating arm slidable axially of the support; means to shift the control member towards the indicator-operating arm; a rigid arm secured to the support; a feeler arm pivoted to the rigid arm; a feeler finger adjustably connected to the feeler arm; a transmitting member between the pivoted feeler arm and the control member, the transmitting member arranged parallel with the axis of the support; and a guide in which the transmitting member is slidably held to insure the transmission of a direct thrust in line with the path of travel of the control member.

In testimony whereof I affix my signature.

AUGUST G. SCHWIETERMAN.